United States Patent [19]

Stiles et al.

[11] Patent Number: 4,958,516
[45] Date of Patent: Sep. 25, 1990

[54] METHOD AND MEANS FOR DETERMINING AIR MASS IN A CRANKCASE SCAVENGED TWO-STROKE ENGINE

[75] Inventors: Steven D. Stiles, Clarkston; Paul E. Reinke, Rochester; Aparicio J. Gomez, Birmingham, all of Mich.

[73] Assignee: General Motors Corporation, Detroit, Mich.

[21] Appl. No.: 478,124

[22] Filed: Feb. 8, 1990

Related U.S. Application Data

[63] Continuation of Ser. No. 377,383, Jul. 10, 1989, Pat. No. 4,920,790.

[51] Int. Cl.$^5$ .......................................... G01M 15/00
[52] U.S. Cl. ................................. 73/118.2; 123/478
[58] Field of Search ........................... 73/117.3, 118.2; 123/65 R, 478; 364/431.05

[56] References Cited

U.S. PATENT DOCUMENTS

| | | | |
|---|---|---|---|
| 4,402,294 | 9/1983 | McHugh et al. | 123/480 |
| 4,446,523 | 5/1984 | Reinke | 364/431.05 |
| 4,461,260 | 7/1984 | Nonaka et al. | 123/478 |
| 4,664,090 | 5/1987 | Kabasin | 123/494 |
| 4,750,352 | 6/1988 | Kolhoff | 73/117.3 |
| 4,788,854 | 12/1988 | Javaherian | 73/117.3 |
| 4,846,132 | 7/1989 | Binnewies | 73/118.2 X |

Primary Examiner—Jerry W. Myracle
Attorney, Agent, or Firm—Howard N. Conkey

[57] ABSTRACT

A method and apparatus are described for determining the mass of air available for combustion within a cylinder of a crankcase scavenged two-cycle engine, without the use of a mass-air flow sensor. This is achieved by estimating the mass of air under compression within a crankcase chamber, prior to its transfer to a cylinder combustion chamber. The estimate for air mass is based upon the integration of crankcase pressure over the interval of decreasing crankcase volume, while air within the crankcase is under compression. The volume of the air within the crankcase chamber is derived as a function of engine cycle position, with crankcase air temperature being derived as a function of intake air temperature. Air pressure during compression is monitored with a crankcase pressure sensor. The estimate for air mass is corrected to account for air leakage and incomplete transfer of the air between the crankcase and combustion chambers.

5 Claims, 2 Drawing Sheets

METHOD AND MEANS FOR DETERMINING AIR MASS IN A CRANKCASE SCAVENGED TWO-STROKE ENGINE

This is a continuation of application Ser. No. 377,383 filed on July 10, 1989, now U.S. Pat. Ser. No. 4,920,790.

BACKGROUND OF THE INVENTION

This invention relates to the determination of engine mass air-flow and more particularly to a method and means for deriving an indication of the mass of air available for combustion within a cylinder of a crankcase scavenged two-stroke engine.

In a crankcase scavenged two-stroke engine, each cylinder has a separate crankcase chamber into which air is inducted during a portion of the engine operating cycle. The inducted air is compressed during part of the engine cycle, when the crankcase chamber is decreasing in volume, and is then transferred to a combustion chamber where it is mixed with fuel for ignition.

In order to effectively control the emission and performance characteristics of crankcase scavenged two-stroke engines, it is necessary to know the mass of air available at the time of combustion within a cylinder. Once such information is known, critical engine parameters, such as spark advance, fueling requirements, and injector timing, can be adjusted to achieve the desired emission and performance objectives.

Mass air-flow sensors are commercially available, and have been used with internal combustion engines in the past to provide the required information regarding the air mass available for combustion. However, at the present time, mass-air flow sensors with sufficient accuracy are relatively expensive as compared to other sensors used for engine control.

Consequently, a need exists for an alternative technique for deriving an indication of the air mass available for combustion within crankcase scavenged two-stroke engines.

SUMMARY OF THE INVENTION

The present invention is directed toward providing a method and means for determining the mass of air available for combustion within a cylinder of a crankcase scavenged two-stroke engine, with sufficient accuracy to enable proper engine control, and without requiring a mass air-flow sensor.

According to one aspect of the invention, the mass of air available for combustion within a cylinder is obtained by estimating the mass of air under compression within a crankcase chamber, prior to its transfer to the associated cylinder combustion chamber. The estimate for air mass is derived by integrating the pressure of the air with respect to change in crankcase volume, during that portion of the engine cycle when the air is under compression within the crankcase chamber, and dividing that result by a factor containing the difference in the temperature of the air at the end and beginning of compression. As a result, the present invention eliminates the need for a mass-air flow sensor in determining the air mass available for combustion within a cylinder.

In another aspect of the invention, the crankcase volume is derived as a function of the engine cycle position. Preferably, the volume within a crankcase chamber at a given time is defined by the angular rotation of the engine crankshaft as measured by means already existing for the control of engine spark timing.

As contemplated by a further aspect of the invention, the temperature of air within the crankcase is derived as a function of the intake air temperature. Temperature sensors typically have long lag times relative to engine cycle time, and as a result, the measurement of intake air temperature is more accurate than the measurement of crankcase air temperature. Also, means for measuring intake air temperature already exists in conventional engine control system. Consequently, by deriving crankcase air temperature as a function of air intake temperature, the invention typically does not require an additional temperature sensor to function properly.

In yet another aspect of the invention, the pressure of air within a crankcase chamber is preferably derived from a conventional pressure sensor, disposed within the crankcase chamber. As a result, the invention requires only the addition of a relatively inexpensive pressure sensor to a conventional computer controlled engine system to enable the determination of the mass of air available for combustion within an engine cylinder.

According to still another aspect of the invention, the estimated mass of air transferred to a combustion chamber is corrected to account for air leakage out of the crankcase and combustion chambers, and for the incomplete transfer of the mass of air from the crankcase to the combustion chamber. Thus, a more accurate estimate of the mass of air available for combustion is achieved.

These and other aspects and advantages of the invention may be best understood by reference to the following detailed description of a preferred embodiment when considered in conjunction with the accompanying drawing.

DESCRIPTION OF THE PREFERRED EMBODIMENT

Figure 1:
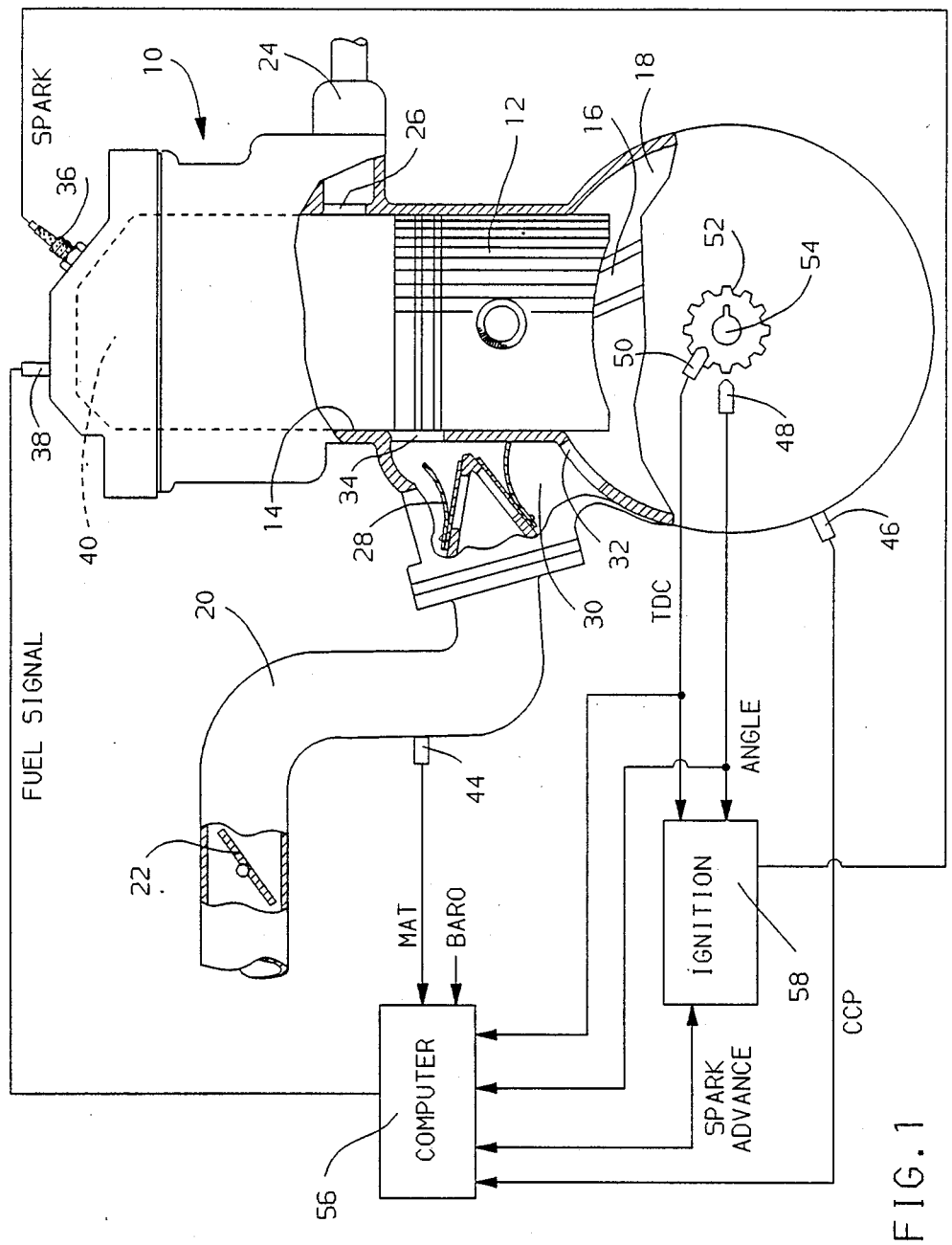
FIG. 1 is a schematic diagram of one cylinder of a crankcase scavenged two-stroke engine and control system therefore, that includes the system for estimating the mass of air available for combustion in accordance with the principles of this invention.

Referring to FIG. 1, there is shown schematically a crankcase scavenged two-stroke engine, generally designated as 10, with a portion of the engine exterior cut away, exposing cylinder 14. Piston 12 resides within the wall of cylinder 14, with rod 16 connecting piston 12 to a rotatable crankshaft, not shown, but disposed within crankcase chamber 18. Connected to engine 10 is an air intake manifold 20 with a throttle 22, and an exhaust manifold 24. Cylinder 14 communicates with exhaust manifold 24 through exhaust port 26 in the wall of cylinder 14. Intake manifold 20 communicates with cylinder 14 and crankcase chamber 18 through a reed valve checking mechanism 28, which opens into a common air transfer passage 30 linking crankcase port 32 with inlet port 34 in the wall of cylinder 14. Cylinder 14 is provided with a spark plug 36 and an electric solenoid driven fuel injector 38 projecting into combustion chamber 40.

Associated with engine 10 are various conventional sensors known to the art, which provide typical signals related to engine control. Located within the air intake manifold 20 is a temperature sensor 44 for measuring manifold air temperature (MAT). Another sensor, not shown in FIG. 1, provides a signal related to the atmospheric barometric pressure (BARO) for use in controlling engine 10. Electromagnetic sensors 48 and 50 provide pulsed signals indicative of crankshaft rotational angle (ANGLE) and the top dead center (TDC) position for cylinder 14, by respectively sensing movement of the teeth on ring gear 52 and disk 54, which are attached to the end of the engine crankshaft.

Computer 56 is a conventional digital computer used by those skilled in the art for engine control, and includes the standard elements of a central processing unit, random access memory, read only memory, analog-to-digital converter, input/output circuitry, and clock circuitry. Signals from the previously mentioned sensors flow over the indicated paths and serve as inputs to computer 56. Using these inputs, computer 56 performs the appropriate computations, and provides an output FUEL SIGNAL to fuel injector 38 and an output SPARK ADVANCE signal to ignition system 58.

Ignition system 58 generates a high voltage SPARK signal, which is applied to spark plug 36 at the appropriate time, as determined by the SPARK ADVANCE signal supplied by computer 56 and the position of the engine crankshaft given by the ANGLE and TDC input signals. Ignition system 58 may include a standard distributor or take any other appropriate form in the prior art.

The operation of engine 10 will now be briefly described based upon the cycle occurring in cylinder 14. During the upstroke, piston 12 moves from its lowest position in cylinder 14 toward top dead center. During the upward movement of piston 12, air inlet port 34 and exhaust port 26 are closed off from the combustion chamber 40, and thereafter, air is inducted into crankcase chamber 18 through reed valve 28. Air in combustion chamber 40, above piston 12, is mixed with fuel from injector 38 and compressed until spark plug 36 ignites the mixture near the top of the stroke. As combustion is initiated, piston 12 begins the downstroke, decreasing the volume of crankcase chamber 18 and the air inducted therein, due to closure of reed valve 28. Toward the end of the downstroke, piston 12 uncovers exhaust port 26 to release the combusted fuel, followed by the uncovering of inlet port 34, enabling compressed air within the crankcase chamber 18 to flow through the air transfer passage 30 into cylinder 14. The cycle begins anew when piston 12 reaches the lowest point in cylinder 14.

In order to effective control of the emission and performance characteristics of the crankcase scavenged, two-stroke engine 10, it is necessary to know the mass of air available in cylinder 14 at the time of combustion. Once this information is known, critical engine parameters such as spark advance, fueling requirement, and injector timing can be adjusted to achieve the engine emission and performance objectives.

Mass-air flow sensors are commercially available, and have been used in the past to provide the required information regarding air mass; however, at the present time, these sensors are relatively expensive, and an alternative means for deriving mass air information is desirable. As a consequence, the preferred embodiment of the present invention is directed toward providing an estimate of the air mass available for combustion within cylinder 14, without the use of a mass-air flow sensor.

The mathematical equations, upon which the invention is based, will be derived with respect to the mass of air available for combustion within cylinder 14, based upon indications of pressure, temperature, and the change in volume of air under compression within a crankcase chamber, prior to transference of the air into combustion chamber 40.

Assuming the mass of air under compression within the crankcase chamber 18 to behave as an ideal gas, the derivation starts from the First Law of Thermodynamics, $$W(1\rightarrow 2) - Q(1\rightarrow 2) = +U2 - U1, \quad (1)$$

where Q is the heat transferred out of the crankcase chamber 18, W is the work done in compressing the air within the crankcase chamber 18, and $U2-U1$ is the change in internal energy of the air from state 1 to state 2, while under compression. Since the temperature gradient across the wall of crankcase chamber 18 is small (the initial temperature of air inducted into the crankcase 18 is approximately ambient), and the compression process is relatively fast compared to the rate of heat transfer, the net heat transfer out of crankcase chamber 18 is approximately zero. Therefore, equation (1) can be written as:

$$W = U;2 - U;1. \quad (2)$$

From the definition of work done on a gas under compression:

$$W = \int_{V1}^{V2} PdV, \quad (3)$$

where dV is the differential change in crankcase volume, P is crankcase pressure, V1 is the volume of the air at the beginning of compression at top dead center in cylinder 14, and V2 is the volume of the air at the end of compression, when air inlet port 34 opens. Also, from the definition of internal energy, $$U2 - U1 = M*(u2 - u1), \quad (4)$$

where M is the mass of air in crankcase chamber 18, and $u2-u1$ is the change in the specific internal energy of the air under compression from state 1 to state 2. From equations (2)–(4), the mass of air M within crankcase chamber 18 is given by:

$$M = \int_{V1}^{V2} PdV/(u2 - u1). \quad (5)$$

Since the pressure of the air P in crankcase chamber 18 never exceeds the critical pressure, it can be assumed that the air behaves as an ideal gas, thus the change in the specific internal energy of the air is given by:

$$u2 - u1 = Cv*(T2 - T1), \quad (6)$$

where Cv is the specific heat capacity of the air at constant volume, T1 is the temperature of the air at the beginning of compression, and T2 is the temperature of the air at the end of compression. Combining equations (5) and (6) gives $$M = \int_{V1}^{V2} PdV/\{Cv*(T2 - T1)\}, \quad (7)$$

where the air mass M within crankcase chamber 18 is given by integrating the pressure of the air P with respect to the change in volume of the air from V1 to V2, during that portion of the engine cycle when the air is being compressed within crankcase chamber 18, and dividing that result by the product of the specific heat capacity of air and the difference in temperature of the air (T2−T1), at the respective volumes V2 and V1.

A conventional temperature sensor could be used to measure the difference in temperature (T2−T1) within the crankcase 18, however, temperature sensors typically have long response times relative to the time required for the compression process, making it difficult to obtain an accurate measurements for (T2−T1). Thus, an approximation is used for the difference in temperature (T2−T1) in equation (7), which eliminates the necessity of a crankcase temperature sensor. This is accomplished by first assuming that the initial crankcase air temperature T1, at the start of compression, is approximately equal to the air intake temperature. Next, using the Ideal Gas Law expression, $$M = PV/RT, \quad (8)$$

where R is the Universal Gas Constant, the temperature of the crankcase air at the beginning and end of compression are given by the following two equations:

$$T1 = (P1*V1)/M*R), \text{ and} \quad (9)$$

$$T2 = (P2*V2)/(M*R). \quad (10)$$

Dividing equation (10) by equation (9), and solving for T2 gives $$T2 = T1*(P2*V2)/(P1*V1). \quad (11)$$

Substituting equation (11) into equation (7), the mass of air M under compression within crankcase chamber 18 is given by $$M = \int_{V1}^{V2} PdV/[Cv*T1*\{(P2*V2)/(P1*V1) - 1\}]. \quad (12)$$

Thus, the mass of air M can be determined by using equation (12), where T1 is the air intake temperature, P is the pressure of air within crankcase chamber 18, and dV is the differential change in crankcase volume. The terms V1 and P1 are respectively, the crankcase volume and pressure at top dead center in cylinder 14, when compression of the air within the crankcase begins. The terms V2 and P2 are respectively, the crankcase volume and pressure at the time when piston 12 uncovers air inlet port 34 to end crankcase compression. The preferred embodiment of the present invention, which implements the method and means for estimating the combustion chamber air mass based upon equation (12), will now be described.

In order to perform the computations required by equation (12), computer 56 must be provided with a means for deriving the air pressure within crankcase 18. In the preferred embodiment of the present invention, this requirement is satisfied by disposing a pressure sensor 46 within crankcase chamber 18 to measure the pressure and develop a corresponding signal CCP for input to computer 56. Pressure sensor 46 may be any type of known pressure sensor which is capable of sensing the air pressure within crankcase chamber 18. With the exception of pressure sensor 46, computer 56 has all of the other necessary inputs, from the conventional engine control system described previously, to enable computation of the mass of air M given by equation (12).

Temperature sensor 44 located in the intake manifold 20 measures the manifold air temperature and provides signal MAT, which is the equivalent of the temperature T1 required in equation (12).

Based upon the known relationship between the volume of crankcase cavity 18 and the angular rotation of the crankshaft from top dead center, the volume V and the change in this volume dV, as required by equation (12), can be derived from the pulsed signals TDC and ANGLE, provided by electromagnetic sensors 50 and 48 respectively. The angle of crankshaft rotation from top dead center is obtained by counting the number of pulses occurring in the ANGLE signal, after the occurrence of a pulse in the TDC signal, and then multiplying the number of pulses counted by the angular spacing of teeth in the ring gear 52.

Figure 2:
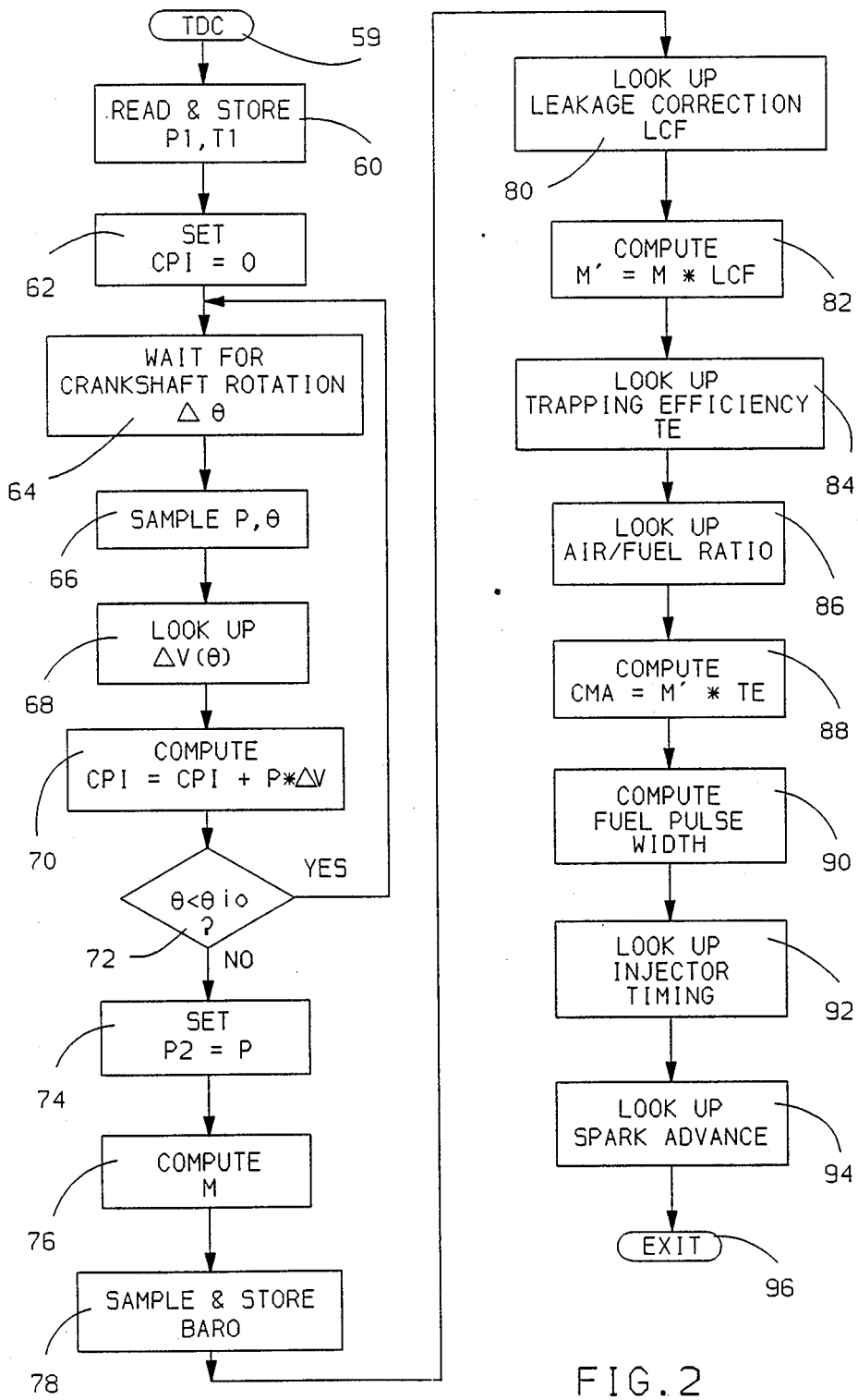
FIG. 2 is a flow diagram representing program instructions executed by the computer in FIG. 1 in determining the mass of air available for combustion base on the integration of crankcase pressure over the interval of decreasing crankcase volume.

For each occurrence of cylinder 14 top dead center, indicated by a pulse in the TDC signal, computer 56 responds by initiating a program stored in memory. The program computes the mass of air M given by equation (12), makes corrections for air leakage and incomplete air transfer, and thereafter computes engine control outputs for that particular cylinder based upon the corrected estimate of mass air available for the next ignition event. The flow diagram of FIG. 2 illustrates the steps in the stored routine that are executed by computer 56 for each occurrence of a cylinder top dead center. Programming of computer 56 to implement this series of steps will be clear to any programmer skilled in the art of engine control.

Referring now to FIG. 2, the flow diagram will be described with respect to the occurrence of top dead center in cylinder 14, which causes entry into the routine at step 59. The program begins at step 60 where the computer determines and stores initial conditions by sampling input signals CCP and MAT, and stores these values as P1 and T1 respectively. P1 is the initial crankcase air pressure, and T1 is the initial crankcase air temperature, both determined just prior to the beginning of compression within crankcase chamber 18. P1 is also indicative of the pressure within intake manifold 20, since reed valve 28 is not yet closed when top dead center occurs in cylinder 14. The initial value for the volume V1 of crankcase chamber 18, at top dead center, is known apriori for engine 10 and is permanently stored in the computer read only memory.

The program next proceeds to step 62 where a variable CPI, representing the crankcase pressure integral, is set to a value of zero. This initialization is required before numerically computing a value for the crankcase pressure integral term in equation (12).

The program next executes a loop consisting of steps 64 to 72 in computing the crankcase pressure integral. At step 64, the program waits for the crankshaft to rotate a predetermined angle $\Delta\theta$ before proceeding to the next program step. As discussed previously, values of $\theta$ are derived by counting pulses in the ANGLE signal. In the preferred embodiment of this invention $\Delta\theta$ is set at 20 degrees, but other embodiments are possible using different values. Once the crankshaft rotates $\Delta\theta$, the crankshaft rotation angle $\theta$ and the crankcase pressure signal CCP are sampled, with the value for CCP being assigned to the variable P at step 66. At step 68, a value for the change in crankcase volume $\Delta V$, for the most recent $\Delta\theta$ rotation of the crankshaft, is looked up in a table permanently stored in memory. Values in the look up table for $\Delta\theta$ are stored as a function of crankshaft rotation $\theta$, and are determined by measuring the volume within a crankcase chamber as the crankshaft is rotated. In the next step 70, a new value is assigned to CPI, the variable representing the crankcase pressure integral. The new value for CPI is equal to the previous value of CPI, plus the product of the crankcase pressure P and change in crankcase volume $\Delta V$. At step 72, the current rotational angle $\theta$ is compared with the angle $\theta$io representing the point in rotation where the air inlet valve 34 in cylinder wall 14 is about to open (see FIG. 1). When $\theta < \theta$io, then air in the crankcase is still under compression and the program returns to step 64 to wait for another $\Delta\theta$ rotation of the crankshaft before repeating the execution of steps 66 to 72 in the loop. However, when $\theta = \theta$io, the program exits the loop at step 72. For engine 10, to which the preferred embodiment of the present invention is applied, the crankshaft rotational angle $\theta$io=120°, just prior to the opening of the air inlet port 34. After exiting the loop, the value assigned to the variable CPI will represent the numerically computed integral of crankcase pressure over the interval of decreasing crankcase volume during compression, as required by equation (12).

At step 74, the current value of crankcase pressure P, at $\theta = \theta$io, is assigned to P2, which represents the final pressure at the end of compression within the crankcase. A value for V2, the final crankcase volume at the end of compression, is known apriori and permanently stored in memory.

Next at step 76, the value for mass air M within the crankcase chamber is computed according to equation (12), using the computed value for CPI and the other appropriate values stored in memory. The value of any scaling constants, such as Cv, required for this, or subsequent computer computations, are permanently stored in memory, and hence, will not be further discussed in the remainder of this description.

At step 78, the program samples the input BARO signal to the computer, and assigns the sampled value to the variable BARO, which represents the atmospheric barometric pressure at which the engine is operating.

At step 80, the program looks up a leakage correction factor LCF in a table stored in memory, using the stored values for P1 and BARO determined at steps 60 and 78, respectively. The leakage correction factor LCF represents the percentage of the mass of air M remaining within the crankcase chamber 18 at the end of compression, after air loss due to leakage through reed valve 28 and gaskets sealing the crankcase chamber. The stored values for the leakage correction factor are determined apriori as a function of the intake manifold pressure, as indicated by P1, and atmospheric barometric pressure BARO. The amount of air leakage through crankcase seals being a function of the difference between the crankcase pressure and BARO, while the amount of air leakage through the reed valve is a function of the difference between crankcase pressure and the pressure within intake manifold 20, as indicated by P1.

At step 82, the program computes M', the mass of air contained within the crankcase after correction for leakage. The value for M' is computed by multiplying the value of M found at step 76 by the leakage correction factor LCF found at step 80, or $$M' = M*LCF. \tag{13}$$

At step 84, the program looks up a value for trapping efficiency TE in a table stored in memory, using values for M', calculated in the previous step 82, and the current engine speed in RPM, derived by counting the number of TDC pulses which occur per minute. The trapping efficiency TE represents that percentage of the corrected mass air M' within crankcase chamber 18, which is transferred and captured within combustion chamber 40, after closure of air inlet port 34 and exhaust port 26. Values for trapping efficiency are determined apriori as a function of the mass of air M' in crankcase chamber 18, and the engine RPM, which is related to the time available for air to pass through inlet port 34 or be lost out exhaust port 26.

Next at step 86, the appropriate air/fuel ratio A/F for cylinder 14 is looked up in a stored table, using values for the corrected mass air M' and the engine RPM. The desired values the air/fuel ratio table are determined apriori by standard engine dynamometer measurements known to those skilled in the art of engine control, as are the other conventional look up tables referred to in this description.

At step 88, the mass of air CMA, which is available for combustion within cylinder 14 is computed by multiplying the corrected crankcase air mass M', found at step 82, by the trapping efficiency TE, found at step 84, according to the equation $$CMA = M'*TE. \tag{14}$$

In the remaining steps 90 to 94, the combustion chamber mass air CMA, found at previous step 88, is used to compute standard engine control parameters. At step 90, the injector fuel pulse width FPW is computed according to the following:

$$FPW = K*CMA*[1/(A/F)], \tag{15}$$

where K is a predetermined units scaling constant stored in memory, CMA was found in step 88, and A/F was determined in step 86. Next, at step 92, the proper timing for the fuel pulse to injector 38 is looked up in the appropriate table stored in memory, based upon the value of the engine RPM and the combustion chamber mass air CMA. Using the computed values for fuel pulse width FPW and the injector timing, computer 56 provides the appropriate FUEL SIGNAL (see FIG. 1) to injector 38. Finally, at step 94, the correct spark advance for cylinder 14 is found in a stored look up table as a function of engine RPM and combustion chamber mass air CMA. Computer 56 provides ignition system 58 with the SPARK ADVANCE signal so that spark plug 36 can be fired at the proper time in advance of top dead center for cylinder 14. After the above steps have been executed, the routine is exited 96.

The foregoing description of a preferred embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. In a crankcase scavenged two-stroke engine characterized by an operating cycle including portions during which air is inducted into a crankcase chamber of the engine, is thereafter compressed within the crankcase chamber while trapped in the crankcase chamber as the crankcase chamber undergoes shrinking volume, and is then transferred to the combustion chamber; a method for determining the mass of air transferred to the combustion chamber comprising the steps of:

determining a portion of the operating cycle at which inducted air is trapped in the crankcase;

determining the pressure P of the air mass M within the crankcase chamber during the determined portion of the operating cycle;

determining the volume V of the crankcase chamber during the determined portion of the operating cycle;

determining the temperature T of the air mass within the crankcase chamber during the determined portion of the operating cycle; and deriving an indication of the mass of air transferred to the combustion chamber in accordance with a predetermined function of derived pressure P, volume V and temperature T.

2. In a crankcase scavenged two-stroke engine characterized by an operating cycle including portions during which air is inducted into a crankcase chamber of the engine, is thereafter compressed within the crankcase chamber while trapped in the crankcase chamber as the crankcase chamber undergoes shrinking volume, transferred to the combustion chamber and is then trapped in the combustion chamber; a method for determining the mass of air trapped in the combustion chamber comprising the steps of:

determining a portion of the operating cycle at which inducted air is trapped in the crankcase;

determining the pressure P of the air mass M within the crankcase chamber during the determined portion of the operating cycle;

determining the volume V of the crankcase chamber during the determined portion of the operating cycle;

determining the temperature T of the air mass within the crankcase chamber during the determined portion of the operating cycle;

deriving an indication of the mass of air trapped in the crankcase chamber in accordance with a predetermined function of derived values of the pressure P, volume and temperature T;

determining a trapping efficiency value representing the percentage of the derived indication of the mass of air trapped in the crankcase chamber that is transferred to and then trapped in the combustion chamber; and adjusting the derived indication of the mass of air trapped in the crankcase chamber in accord with the determined trapping efficiency value to provide a measure of the air mass trapped in the combustion chamber.

3. In a crankcase scavenged two-stroke engine characterized by an operating cycle including portions during which air is inducted into the engine, is thereafter compressed within a crankcase chamber of shrinking volume, and is then transferred to the combustion chamber; a method for determining the mass of air transferred to the combustion chamber comprising the steps of:

deriving an indication of the pressure P of the air mass within the crankcase chamber during compression;

deriving an indication of the volume V of the crankcase chamber during compression; and deriving an indication of the mass of air transferred to the combustion chamber in accordance with the expression $$M = W/(u2 - u1)$$

where W is the work done in compressing the air in the crankcase chamber between an initial crankcase volume V1 and a final crankcase volume V2 and u2−u1 is the change in the specific internal energy in the air between the initial crankcase volume V1 and the final crankcase volume V2.

4. In a crankcase scavenged two-stroke engine characterized by an operating cycle including portions during which air is inducted into the engine, is thereafter compressed within a crankcase chamber of shrinking volume, and is then transferred to the combustion chamber; a method for determining the mass of air transferred to the combustion chamber comprising the steps of:

deriving an indication of the pressure P of the air mass M within the crankcase chamber during compression;

deriving an indication of the volume V of the crankcase chamber during compression;

deriving an indication of the temperature T of the air mass within the crankcase chamber during compression; and deriving an indication of the mass of air transferred to the combustion chamber in accordance with the expression $$M = W/\{Cv(T2 - T1)\}$$

where W is the work done in compressing the air in the crankcase chamber between an initial crankcase volume V1 and a final crankcase volume v2, Cv is the specific heat capacity of air at constant volume, T1 is the temperature of the air in the crankcase chamber when at the initial crankcase volume V1 and T2 is the temperature of the air in the crankcase chamber when at the final crankcase volume V2.

5. In a crankcase scavenged two-stroke engine characterized by an operating cycle including portions during which air is inducted into an intake manifold and then into a crankcase chamber of the engine, is thereafter compressed within the crankcase chamber during a portion of the operating cycle in which the inducted air is trapped in the crankcase chamber while the crankcase chamber undergoes shrinking volume, an is then transferred to the combustion chamber; a method for determining the mass of air transferred to the combustion chamber comprising the steps of:

deriving an indication of the pressure P of the air mass M within the crankcase chamber during compression;

deriving an indication of the volume v of the crankcase chamber during compression;

measuring the temperature T of the air inducted into the intake manifolds; and deriving an indication of the mass of air transferred to the combustion chamber in accordance with the expression $$M = W/\{Cv(T2-T1)\}$$

where W is the work done in compressing the air in the crankcase chamber between an initial crankcase volume V1 when the air is first trapped in the crankcase chamber and a final crankcase volume V2, Cv is the specific heat capacity of air at constant volume, T1 is the temperature of the air inducted into the intake manifold substantially at the time the air is first trapped in the crankcase chamber and T2 is a temperature of the air in the crankcase chamber when at the final crankcase volume V2 derived in accord with the expression T1(P2*V2)/(P1*V1) where P1 is the pressure of the air mass M when at the initial crankcase volume V1 and P2 is the pressure of the air mass M when at the final crankcase volume V2.

* * * * *